UNITED STATES PATENT OFFICE.

LEOPOLD GRAF, OF NEWARK, NEW JERSEY.

IMPROVEMENT IN DYE-STUFFS OR COLORING MATTER.

Specification forming part of Letters Patent No. 203,140, dated April 30, 1878; application filed February 26, 1878.

*To all whom it may concern:*

Be it known that I, LEOPOLD GRAF, of Newark, in the county of Essex and State of New Jersey, have invented a new and useful Improvement in Dye-Stuffs or Coloring Matter, which improvement is fully set forth in the following specification.

This invention relates to a new dye-stuff or coloring matter, which I prepare from an alkaline solution of leather-scrap.

In carrying out my invention I proceed as follows: I take leather-scrap, about four pounds; caustic soda or potash, about one pound; water, one and one-half gallon.

The leather-scrap which I use is taken from tanned hides and skins, and must not be confused with untanned scraps, which by some persons are also termed "leather scraps."

The ingredients above stated are placed in a closed boiler, and heated until the pressure rises to from one hundred and thirty to two hundred pounds to the square inch, the heat being kept up from one to three hours. At the end of this time the leather has dissolved and the contents of the boiler form a liquid mass. Of this liquid leather I take about ten pounds, and add thereto about one pound of sulphuric acid, diluted with thirty per cent. of water, or an equivalent quantity of muriatic acid, whereby a precipitate is formed, which is separated from the supernatant liquid by filtration. The solid matter remaining on the filter, after having been washed out with clean water, (either warm or cold,) forms my new coloring matter. It has the appearance of a brown slime, and when dried it forms a brown powder.

When I intend to use my coloring matter for dyeing or printing, I dissolve it in ammonia, and apply it to the textile fabrics with the ordinary mordants, such as alum or bichromate of potash. It produces on silk, cotton, and wool a brown color of different shades.

For dyeing leather I use a mordant of borax, and my coloring matter produces a hazel-brown color.

What I claim as new, and desire to secure by Letters Patent, is—

As a new manufacture, a dye or coloring matter having the properties herein specified, and prepared from leather scraps by the method herein described, or by any other method which will produce a like result.

In testimony that I claim the foregoing I have hereunto set my hand and seal this 23d day of February, 1878.

LEOPOLD GRAF. [L. S.]

Witnesses:
W. HAUFF,
E. F. KASTENHUBER.